United States Patent
Fletcher et al.

[11] 3,958,188
[45] May 18, 1976

[54] FIBER DISTRIBUTED FEEDBACK LASER

[76] Inventors: James C. Fletcher, Administrator of the National Aeronautics and Space Administration, with respect to an invention of; Charles Elachi, Pasadena, Calif.; Gary A. Evans, Pasadena, Calif.; Cavour Yeh, Pasadena, Calif.

[22] Filed: Dec. 11, 1974

[21] Appl. No.: 531,565

[52] U.S. Cl. .................. 331/94.5 C; 350/96 WG
[51] Int. Cl.² .................................. H01S 3/082
[58] Field of Search ............... 331/94.5; 330/4.3; 350/96 WG

[56] References Cited
UNITED STATES PATENTS

| | | | |
|---|---|---|---|
| 3,571,737 | 3/1971 | Miller | 350/96 WG |
| 3,827,000 | 7/1974 | Matsushita | 350/96 WG |
| 3,831,038 | 8/1974 | Dabby et al. | 350/96 WG |

*Primary Examiner*—William L. Sikes
*Attorney, Agent, or Firm*—Monte F. Mott; Paul F. McCaul; John R. Manning

[57] ABSTRACT

Utilizing round optical fibers as communication channels in optical communication networks presents the problem of obtaining a high efficiency coupling between the optical fiber and the laser. A laser is made an integral part of the optical fiber channel by either diffusing active material into the optical fiber or surrounding the optical fiber with the active material. Oscillation within the active medium to produce lasing action is established by grating the optical fiber so that distributed feedback occurs.

36 Claims, 36 Drawing Figures

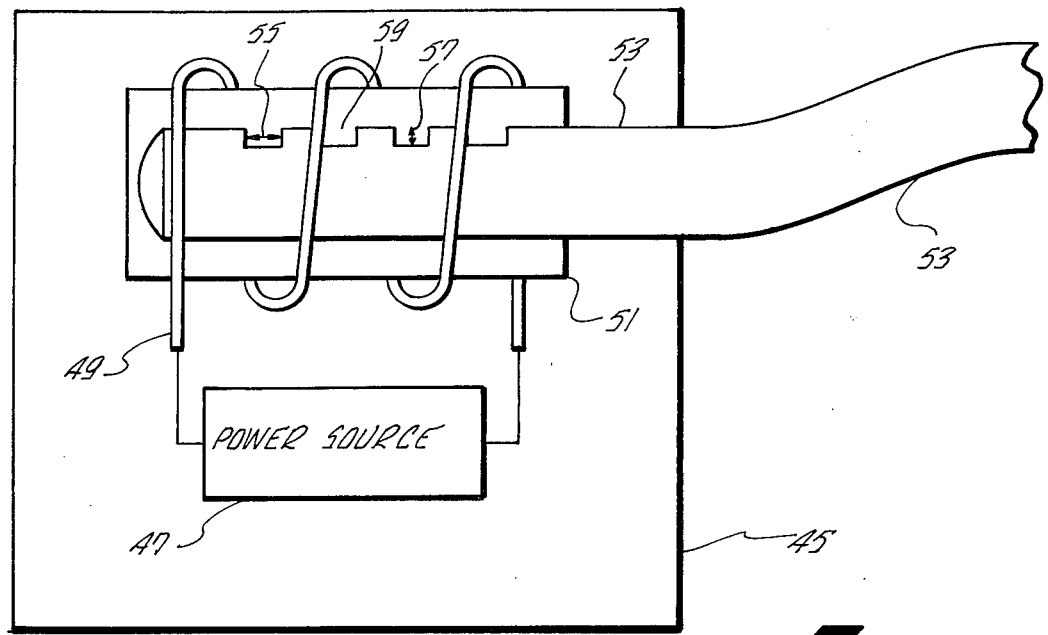
FIG_3.
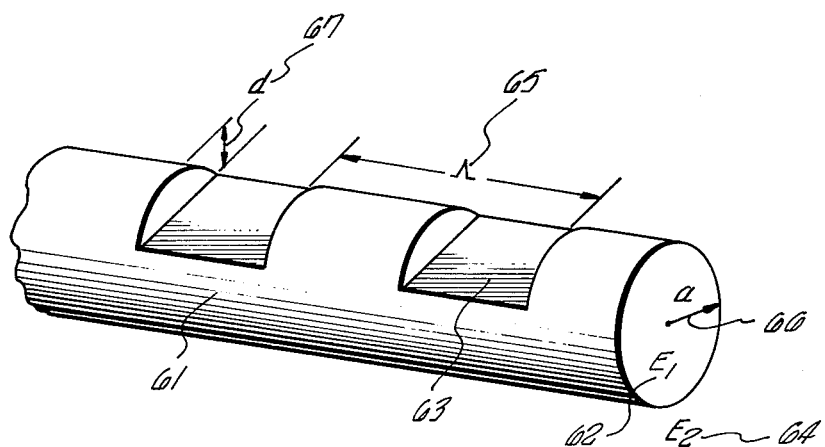
FIG_4.
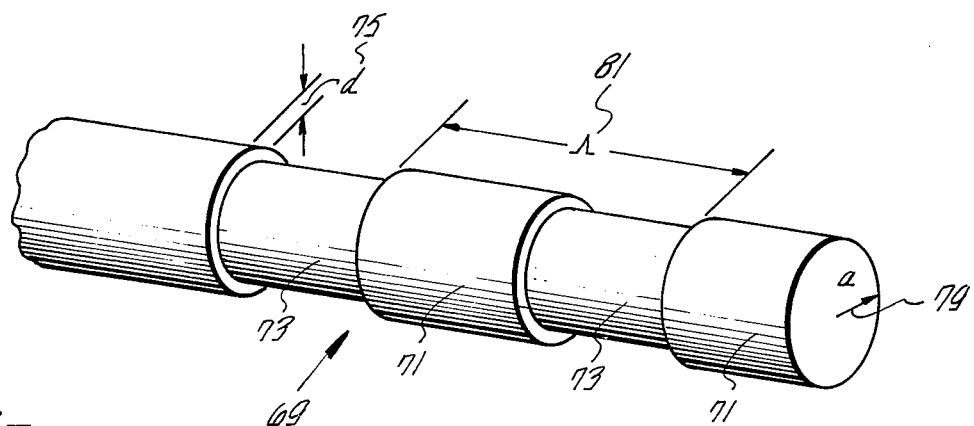
FIG_5.

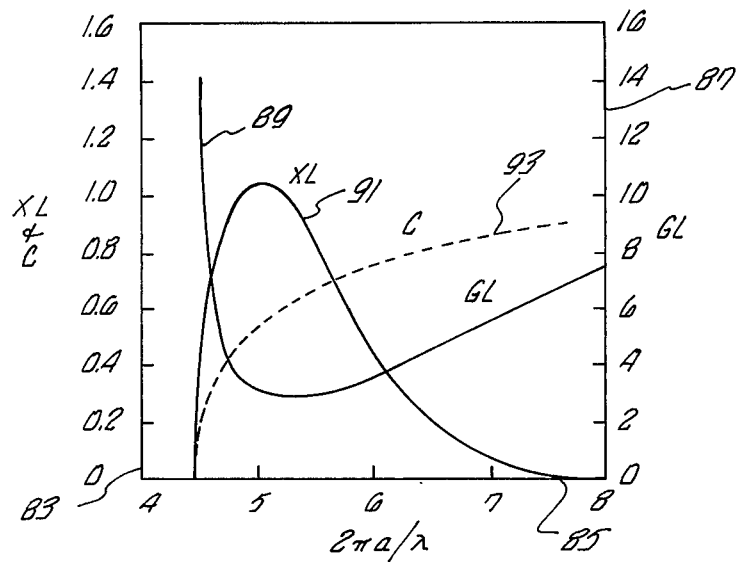
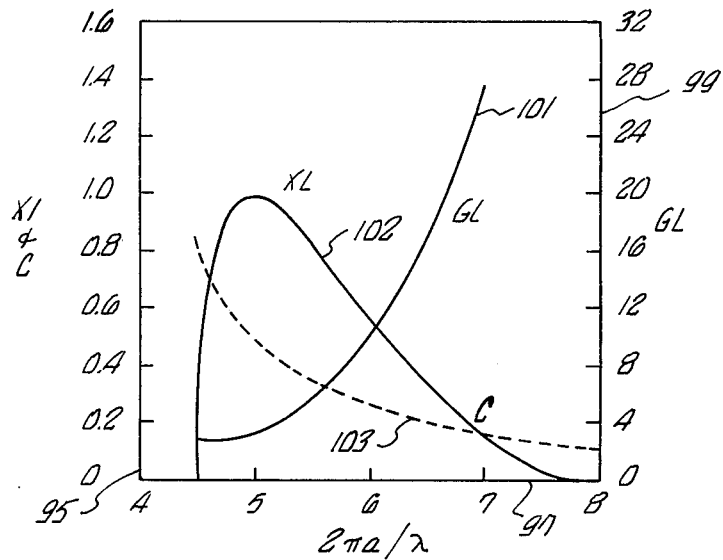
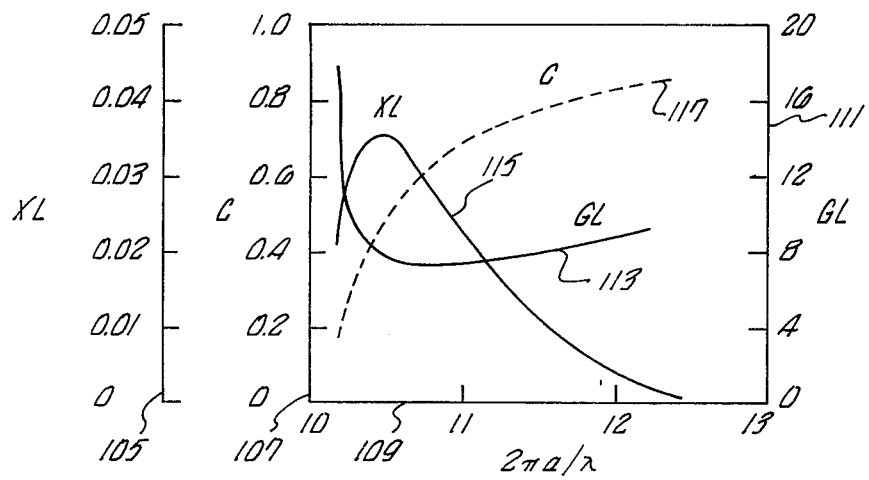

FIBER DISTRIBUTED FEEDBACK LASER

BACKGROUND OF THE INVENTION

ORIGIN OF THE INVENTION

The invention described herein was made in the performance of work under a NASA Contract and is subject to the provisions of Section 305 of the National Aeronautics and Space Act of 1958, Public Law 85-568 (72 STAT 435; 42 USC 2457).

FIELD OF THE INVENTION

This invention generally relates to distributed feedback lasers. More particularly, the present invention pertains to optical fiber lasers utilizing distributed feedback.

DESCRIPTION OF THE PRIOR ART

Present day optical communication systems utilize fiber optical transmission lines to couple a laser signal from one functional unit to another, for example, from a scanner to a demodulator or detector. FIG. 1 illustrates a prior art arrangement wherein a laser device 11 is coupled to an optical fiber transmission line 13. An active medium 19 such as, a ruby rod is placed within a resonating cavity created by mirrors 21, 23. The active medium is pumped by an optical energy source 17 driven by a power supply 15. The coherent photon energy leaves the cavity by way of partially silvered mirror 23 and is directed into an end of the optical line 13. This type of prior art arrangement exhibits a loss of signal at the interface 27 between the laser device and the optical transmission line 13.

OBJECTS AND SUMMARY OF THE INVENTION

An object of this invention is to reduce signal loss between a laser mechanism and an optical fiber transmission channel.

A further object of this invention is to provide a laser mechanism that utilizes an optical fiber with gratings therein spaced to induce distributed feedback in the active medium.

Yet another object of this invention is to provide a laser mechanism that is an integral part of an optical fiber transmission channel.

These objects and the general purpose of the invention are accomplished by integrating the optical fiber with the active material. Oscillation in the active medium is obtained by grating the fiber so that distributed feedback occurs as the result of Bragg reflection.

BRIEF DESCRIPTION OF THE DRAWINGS

The exact nature of this invention as well as other objects and advantages thereof will be readily apparent from consideration of the following specification related to the annexed drawings in which like reference numerals designate like parts throughout the figures thereof and wherein:

FIG. 3 is a block diagram illustrating another embodiment of a distributed feedback laser according to the present invention.

FIG. 4 is a perspective view of a broken-away portion of a machined optical fiber that is used in the present invention.

FIG. 5 is a perspective view of a broken-away portion of a fiber configuration that is analytically equivalent for certain propagation modes to the machined fiber of FIG. 4.

FIG. 6 is a graph illustrating the performance parameters of the laser mechanism of FIG. 2.

FIG. 7 is a graph illustrating the performance parameters of the laser mechanism of FIG. 3.

FIG. 8 is a graph illustrating the performance parameters of the laser mechanism of FIG. 2 when considering an alternate transmission mode.

DESCRIPTION OF THE PREFERRED EMBODIMENT

Figure 1:
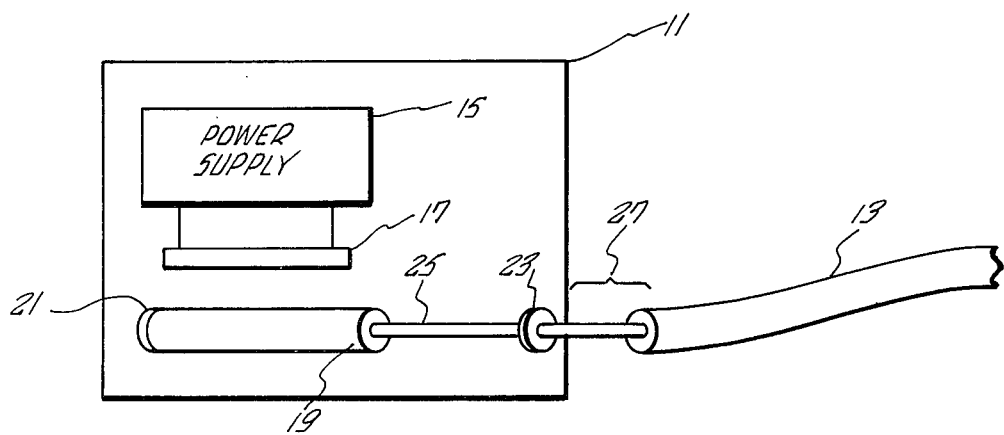
FIG. 1 is a block diagram illustrating, partially in perspective, a prior art laser mechanism.
Figure 2:
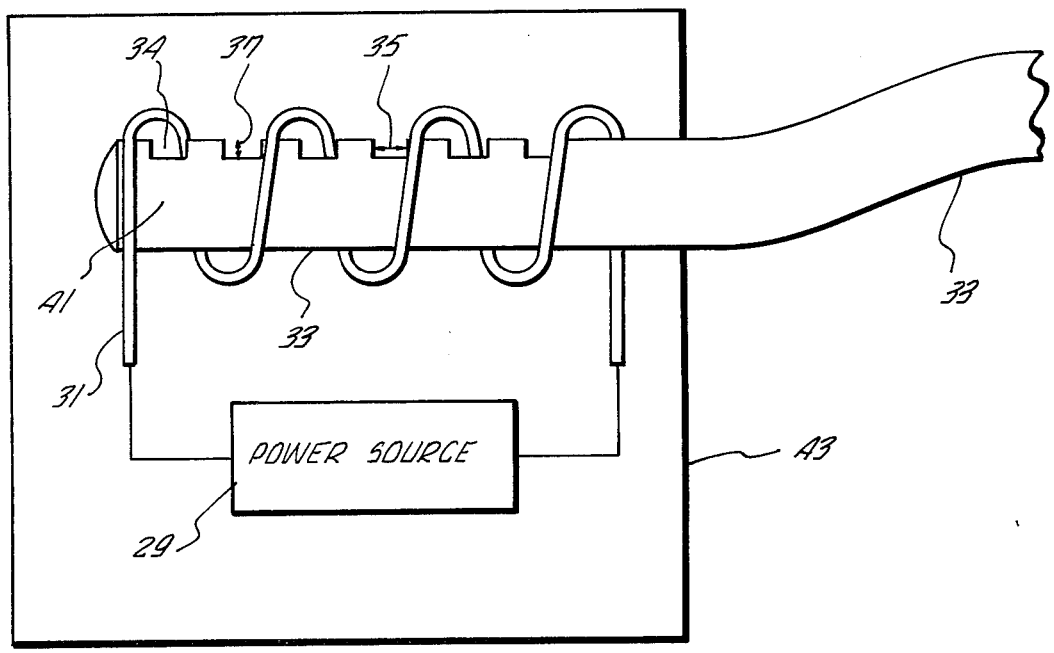
FIG. 2 is a block diagram illustrating a distributed feedback laser according to the present invention.

Referring first to FIG. 2, which illustrates a preferred embodiment of the present invention, a laser device 43 is made an integral part of an optical communication line 33. The laser mechanism comprises a certain length of the optical fiber 33, from one end thereof, being doped with an active material 41 such as, neodymium or an organic dye. A grating 34 is micromachined into the optical fiber 33 at a precise depth 37 and displacement 35 along that length. A polychromatic energy source 31 may be spirally wound around the end of the optical fiber 33 that contains the active medium to provide the pumping energy required to produce population inversion in the active medium. The polychromatic radiator could take the form of a discharge lamp with a cylindrical reflector therearound (not shown). An alternate source of pumping energy that may be utilized is a xenon lamp with an elliptical reflector (not shown). A power source 29 provides energy for the pumping source 31.

FIG. 3 illustrates an alternate preferred embodiment of the laser mechanism of this invention as comprising, a laser mechanism 45 that is an integral part of an optical fiber communication line 53. The laser mechanism comprises a certain length at one end of the communication fiber 53 being grated with gratings that have a specified depth 57 and width 55. The grated length of the fiber is inserted in a bath of active material 51 which may be either in a gaseous or liquid state such as, a liquid solution of neodymium oxide ($Nd_2O_3$) dissolved in selenium oxychloride ($SeOCl_2$) acidified with tin tetrachloride ($SnCl_4$). Other types of lasing solutions that may be used are solutions of fluorescent dyes such as, rhodamine for example, in liquids such as, ethyl alcohol.

Instead of immersing the grated end of fiber 53 in a liquid bath of active material, a solid active material may be deposited, by sputtering for example, around the grated optical fiber 53.

A source of polychromatic radiation 49 may be spirally wound around the end of the optical fiber 53 having the active material therearound to provide the pumping energy required for population inversion within the active medium.

FIG. 4 presents a perspective view of a portion of a machined glass rod that is part of the laser mechanism. This portion 61 has grooves 63 micromachined therein that have a certain depth 67 and occur in a certain periodicity 65. Photoresist and ion-milling techniques are known that will produce gratings 59 with a periodicity of approximately 0.2 microns at a peak-to-peak height of approximately 0.1 micron. A report on such a process, authored by Zchinke, Smith, Spencer and Galvin can be found in Applied Physics Letter, Volume 21, No. 10, Nov. 15, 1972. Gratings may also be produced by utilizing an electron-resist, scanning electron microscope technique. The optical fiber utilized has a certain radius "a" 66, and a certain dielectric constant "$\epsilon_1$" 62. The medium surrounding the fiber rod has a certain dielectric constant "$\epsilon_2$," 64.

Perturbing the height of the optical fiber by the gratings 63, along the length of the fiber interacting with an active medium produces effects similar to refractive index changes in the fiber guide medium. The principle of distributed feedback proposed by Kogelnik and Shank in the article titled "Coupled-Wave Theory of Distributed Feedback Lasers" in the Journal of Applied Physics, Volume 43, No. 5, May 1972 relies on Bragg reflection to produce feedback on a local basis. This Bragg reflection will arise as a result of periodic perturbations in the reflective index of a guiding medium. Periodic variation of the height of the guiding medium, as was noted, produces this effect. Use of distributed feedback eliminates the necessity for reflective surfaces at the opposite ends of the lasing medium to create a resonant cavity.

The phase matching condition required to have constructive Bragg reflection is described by the equation:

(1) $\beta_p + \beta_q = 2\pi/\Lambda$ where $\beta_p$ is the longitudinal wavevector of the pth guided mode, and $\beta_q$ is the longitudinal wavevector of the qth guided mode, and $\Lambda$ is the period of the grating.

Laser energy will propagate through a circular optical fiber in all modes at once. Therefore, the theoretical evaluation and analysis of the modes of propagation in the structure shown in FIG. 4 becomes very complex. If, however, the analysis is limited to circularly symmetrical TE modes, the structure of FIG. 5 is an analytical equivalent to the structure of FIG. 4. The mathematical analysis of the function of the structure of Fig. 5 is much more manageable and is considered to be a fairly reliable indicator of the operation of the structure shown in FIG. 4.

The machined mono-filament fiber 69 useful in studying the function of the machined fiber of FIG. 4 consists of an optical glass or plastic fiber having a radius "a" 79 with periodic cut-away sections 73 having a radius smaller than "a" 79. These cut-away sections are placed at a certain periodicity " " 81. The cut-away sections are cut-away at a depth "d," 75. The length the non-cut-away sections 71 equal the length of the cut-away sections 73. The sum of the two lengths is equal to the periodic factor " ," 81.

Only considering circularly symmetrical TE modes, the structure of FIG. 4 is equivalent to the structure of FIG. 5 for the following fiber radius relationships:

r(z) = a           for $0 < z < \Lambda/2$
r(z) = a(1-$\eta$)  for $\Lambda/2 < z < \Lambda$ r(z + $\Lambda$) = r(z)

where:
$\eta = (d/\pi a)(D/2a)^{1/2}$ d = depth of surface corrugation, and $d<<a$.

The effective gain coefficient and the coupling coefficient for TE modes in a circular waveguide, can be evolved as follows. In case of TE propagation, the normalized electric field is given by:

$E_r = E_z = 0$ (2)
$E_\theta = [J_1(sr)/J_1(sa)] \exp(i\beta z - i\omega t)$ where $r \leq a$ (3)
$E_\theta = [K_1(\delta r)/K_1(\delta a)] \exp(i\beta z - i\omega t)$ where $r > a$ where J is the Bessel function and K is the modified Bessel function. The magnetic field can then be derived from Maxwell's equations. The corresponding dispersion relations are:

(4)
$\delta K_o(\delta a)/K_1(\delta a) = -s\, J_o(sa)/J_1(sa)$ (5)
$-\delta^2 + \beta^2 = \epsilon_2 k^2$ (6)
$s^2 + {}^2 = \epsilon_1 k^2$ where $\delta$, s and $\beta$ are the wavevectors, $K = \omega/c$ and $\epsilon_1$, $\epsilon_2$ are the relative dielectric constants in the fiber and the surrounding material.

Assuming that an active medium has a gain coefficient G, whether the optical fiber contains the active medium or the active medium is surrounding the optical fiber, the effective gain coefficient will be CG. The efficiency coefficient can be computed by taking a complex dielectric constant and solving equations 4, 5 and 6 for $\beta$, which is now complex. For the small gain case, the well known Taylor development will produce:

$$C = (k\sqrt{\epsilon_1/\beta})\,\frac{1}{1+F} \qquad (7)$$

for a fiber doped with an active medium, and $$C = (k\sqrt{\epsilon_2/\beta})\,\frac{1}{1+F} \qquad (8)$$

for a fiber surrounded by an active medium where $F = (1 - J_o J_2/J_1^2)/(1 - K_o K_2/K_1^2)$ The same expression for the efficiency coefficient in equation No. 7 above, can be derived from the relation:

$$C = \frac{k\sqrt{\epsilon_1}}{\beta}\left(\frac{P_i}{P_T}\right) \qquad (9)$$

Where $P_i$ is the power in he fiber and $P_T$ is the total power. The first term in equation No. 9 expresses the fact that the optical ray travels a zig-zag line in the guide.

The coupling coefficient between the different TE modes due to the surface corrugations machined into the optical fiber can be determined by using the fact that the surface corrugation is equivalent to a periodic surface current. The coupling coefficient between the pth and qth mode is:

$$\chi_{pq} = \pi \eta a \left(\frac{\epsilon_1 - \epsilon_2}{8}\right) k^2 (Q_p Q_q)^{-1/2}$$

where $$Q_i = \frac{\beta_i}{\delta_i} \frac{J_o}{J_1} \left[ a \left( s_i \frac{K_1'}{K_1} + \delta_i \frac{J_1'}{J_1} \right) - (\epsilon_1 - \epsilon_2) \frac{k^2}{s_i \delta_i} \right]$$

$i = p, q$                                   (10)

The prime value of $K_1$ and $J_1$ corresponds to a derivation relative to the argument.

The threshold gain required to produce lasing action in a distributed feedback structure can be determined by using a modified form of the Kogelnik and Shank approach described in their above noted article. The modification would be necessary to take into account the fact that the coupling between two waves could have different effective gains and group velocity. Making reference now to the graphs of FIGS. 6, 7 and 8, it should be remembered that only the longitudinal mode of propagation closest to the Bragg frequency is being considered.

FIG. 6 illustrates the relationship between the coupling coefficient $\chi L$ curve 91, the efficiency coefficient C curve 93 and the threshold gain GL curve 89 as a function of the operating wavelength $\lambda$ for the 0-0 mode of propagation in the laser structure shown in FIG. 2. X axis 85 illustrates an increasing frequency from left to right as the wavelength of the photon energy emitted from the active medium decreases. Y axis 83 illustrates an increasing coupling coefficient $\chi L$ and efficiency coefficient C from bottom to top. The other Y axis 87 illustrates an increasing threshold gain GL from bottom to top. The L in the coupling coefficient $\chi L$ and the threshold gain GL represents the length of the corrugations in the optical fiber.

From the curves of FIG. 6, it is seen that near cut-off the efficiency coefficient C curve 93, and the coupling coefficient $\chi L$ curve 91 is very small. The threshold gain GL curve 89 starts at a very high value near cut-off and decreases to a minimum as the coupling coefficient $\chi L$ curve 91 increases. The threshold gain GL curve 89 starts to increase again as the coupling coefficient $\chi L$ curve 91 decreases.

The coupling coefficient $\chi L$ curve 91 is small near cut-off because the energy is spread mostly in the area surrounding the fiber. At high frequency the coupling coefficient $\chi L$ is small because the energy is confined in the fiber with a very small field at the periphery. The coupling reaches a maximum somewhere in between cut-off and high frequency. The efficiency coefficient C curve 93 is close to one when the energy is mostly in the active region and close to zero when the energy is mostly outside the active region. In the case of FIG. 6, the curves represent a doped optical fiber having the active material within the fiber. The efficiency coefficiency C curve 93 will, therefore, be zero near cut-off, because the energy is mostly in the area outside the fiber, which is outside the active medium. It increases, and gets closer to one, the higher the frequency gets because the energy begins to be concentrated within the fiber in the active medium.

FIG. 7 illustrates the relationships of the coupling coefficient $\chi L$ curve 102, the efficiency coefficient C curve 103 and the threshold gain GL curve 101 in the laser mechanism illustrated in FIG. 3 where the active material surrounds the optical fiber. The efficiency coefficient C curve 103 approaches zero as the frequency increases because the energy is confined within the fiber at high frequencies and the active region is located around the fiber. At cut-off the efficiency coefficient C curve 103 is close to one because the energy is in the area surrounding the fiber and the active medium is in this area. The threshold gain GL curve 101 illustrates that for the laser structure of FIG. 3, the gain required is relatively smaller at cut-off, probably because the efficiency coefficient is approaching one, and larger at higher frequencies, probably because the efficiency coefficient is approaching zero. The coupling coefficient $\chi L$ curve 102, however, is pretty much the same in the structure of FIG. 3 as in the structure of FIG. 2.

FIG. 8 illustrates the relationships of the efficiency coefficient C coupling coefficient $\chi L$ and threshold gain GL for 0-1 mode coupling in the laser structure shown in FIG. 2. The Y axis 105 represents the coupling coefficient $\chi L$ scale. The Y axis 107 represents the efficiency coefficient C scale. The Y axis 111 represents the threshold gain GL scale. The X axis 109 represents the increasing frequency of the photon energy emitted by the active medium. As can be seen from FIG. 8, the variables, threshold gain, coupling coefficient and efficiency coefficient, for the 0-1 mode behave similar to these variables for the 0-0 mode, illustrated in FIG. 6.

The minimum threshold gain point is the optimum point for design of a laser according to this invention. To illustrate, a specific example will now be given. Consider the case where $d/2\ a = 0.01$ $\eta \cong 6 \cdot 10^{-4}$ $L/a = 6600$, and $\lambda/a = 1.2$ For an active material having a wavelength $\lambda = 1 \mu$ this corresponds to a fiber radius $a = 0.83 \mu$ having micromachined grooves, as shown in FIG. 4 to a depth d of $0.016 \mu$, a width of $0.5 \mu$ with a $0.5 \mu$ spacing for an overall length L of 5.5 millimeters. The corresponding threshold gain coefficient is $GL \cong 3$, which is approaching a total gain of approximately 25 db. This is true for the laser mechanism shown in FIG. 2, having the active medium diffused in the optical fiber. For the laser mechanism shown in FIG. 3, where the active material surrounds the optical fiber, the gain coefficient $GL \cong 4.2$ which approaches a total gain of approximately 35 db. These gains can be easily achieved with many active materials, such as, neodymium and the organic dyes, for example. It should be also noted that a larger value of $d/2a$ would lead to an even lower threshold gain.

In summary, what has been described is a way of reducing the signal loss between a laser mechanism and an optical fiber transmission line. This is accomplished by integrating the laser and the optical fiber transmission line through the technique of distributed feedback. It should be understood, of course, that the foregoing disclosure relates only to preferred embodiments of the invention and that numerous modifications may be made therein without departing from the spirit and the scope of the invention as set forth in the appended claims.

What is claimed is:

1. A laser mechanism comprising:
   an optical fiber having an active material diffused therein;
   pumping means for exciting the atoms in said active material; and
   means for establishing a periodic perturbation in said optical fiber that has a periodicity capable of supporting Bragg reflection.

2. The laser mechanism of claim 1 wherein said establishing means comprises a grating in said optical fiber.

3. The laser mechanism of claim 2 wherein said active material is neodymium.

4. The laser mechanism of claim 3 wherein said pumping means comprises an optical energy source.

5. The laser mechanism of claim 4 wherein said optical energy source comprises: a high intensity light source spirally wound around said optical fiber.

6. The laser mechanism of claim 2 wherein said active material is an organic dye.

7. The laser mechanism of claim 6 wherein said pumping means comprises an optical energy source.

8. The laser mechanism of claim 7 wherein said pumping means comprises a high intensity light source spirally wound around said optical fiber.

9. The laser mechanism of claim 2 wherein said grating has a periodicity equal to N times $\lambda/2$, where N is any integer and $\lambda$ is the wavelength of photons emitted by the active material.

10. A laser mechanism comprising:
    an optical fiber immersed in a bath of liquid active material;
    pumping means for exciting the atoms in said active material; and
    means for establishing a periodic perturbation in said bath of liquid active material capable of supporting Bragg reflection.

11. The laser mechanism of claim 10 wherein said establishing means comprises a grating in said optical fiber.

12. The laser mechanism of claim 11 wherein said active material is neodymium oxide dissolved in selenium oxychloride.

13. The laser mechanism of claim 12 wherein said pumping means comprises an optical energy source.

14. The laser mechanism of claim 13 wherein said optical energy source comprises a high intensity light source spirally wound around said bath of liquid active material.

15. The laser mechanism of claim 11 wherein said active material is a fluorescent dye dissolved in a solution.

16. The laser mechanism of claim 15 wherein said pumping means comprises an optical energy source.

17. The laser mechanism of claim 16 wherein said optical energy source comprises a high intensity light source spirally wound around said bath of liquid active material.

18. The laser mechanism of claim 11 wherein said grating has a periodicity equal to N times $\lambda/2$, where N is any integer and $\lambda$ is the wavelength of photons emitted by the active material.

19. A laser mechanism comprising:
    an optical fiber immersed in a container of gaseous active material;
    pumping means for exciting the atoms in said active material; and
    means for establishing a periodic perturbation in said optical fiber that has a periodicity capable of supporting Bragg reflection.

20. The laser mechanism of claim 19 wherein said establishing means comprises a grating in said optical fiber.

21. The laser mechanism of claim 20 wherein said grating has a periodicity equal to N times $\lambda/2$, where N is any integer and $\lambda$ is the wavelength of photons emitted by the active material.

22. A laser mechanism comprising:
    an optical fiber having an active material deposited thereon;
    pumping means for exciting the atoms in said active material; and
    means for establishing a periodic perturbation in said optical fiber that has a periodicity capable of supporting Bragg reflection.

23. The laser mechanism of claim 22 wherein said establishing means comprises a grating in said optical fiber.

24. The laser mechanism of claim 23 wherein said grating has a periodicity equal to N times $\lambda/2$, where N is any integer and $\lambda$ is the wavelength of photons emitted by the active material.

25. An optical energy distribution system for transporting energy between point A and point B, comprising:
    an optical fiber extending between point A and point B, said fiber having an active material diffused therein for a short distance at point A and being grated for that distance with a periodicity equal to N times $\lambda/2$, where N is any integer and $\lambda$ is the wavelength of photons emitted by the active material; and
    pumping means for exciting the atoms in said active material.

26. The optical energy distribution system of claim 25 wherein said active material is neodymium.

27. The optical energy distribution system of claim 26 wherein said pumping means comprises an optical energy source.

28. The optical energy distribution system of claim 27 wherein said optical source is spirally wound around said optical fiber for the length of grating at point A.

29. An optical energy distribution system for transporting energy between point A and point B, comprising:
    an optical fiber extending between point A and point B, said fiber being immersed in a bath of liquid active material for a short distance at point A and being grated for that distance with a periodicity equal to N times $\lambda/2$, where N is any integer and $\lambda$ is the wavelength of photons emitted by the active material; and
    pumping means for exciting the atoms in said active material.

30. The optical energy distribution system of claim 29 wherein said active material is neodymium oxide dissolved in selenium oxychloride.

31. The optical energy distribution system of claim 30 wherein said pumping means comprises an optical energy source.

32. The optical energy distribution system of claim 31 wherein said optical energy source comprises a high intensity light source spirally wound around said fiber for the length of grating at point A.

33. An optical energy distribution system for transporting energy between point A and point B, comprising:

an optical fiber extending between point A and point B, said fiber having, an active material deposited thereon for a short distance at point A and being grated for that distance with a periodicity equal to N times $\lambda/2$, where N is any integer and $\lambda$ is the wavelength of photons emitted by the active material; and pumping means for exciting the atoms in said active material.

34. The optical energy distribution system of claim 33 wherein said active material is an organic dye.

35. The optical energy distribution system of claim 34 wherein said pumping means comprises an optical energy source.

36. The optical energy distribution system of claim 35 wherein said optical energy source comprises a high intensity light source spirally wound around said optical fiber for the length of grating at point A.

* * * * *